United States Patent
Murphy et al.

(10) Patent No.: US 10,263,696 B2
(45) Date of Patent: Apr. 16, 2019

(54) MONITORING A FIBER OPTIC CABLE FOR INTRUSION USING A WEIGHTED ALGORITHM

(71) Applicant: Network Integrity Systems, Inc., Hickory, NC (US)

(72) Inventors: Cary R. Murphy, Hickory, NC (US); Daniel M Goertzen, Winnipeg (CA); Mark K. Bridges, Hickory, NC (US)

(73) Assignee: Network Integrity Systems, inc., Hickory, NC (US)

( * ) Notice: Subject to any disclaimer, the term of this patent is extended or adjusted under 35 U.S.C. 154(b) by 0 days.

(21) Appl. No.: 16/005,226

(22) Filed: Jun. 11, 2018

(65) Prior Publication Data
US 2019/0074896 A1    Mar. 7, 2019

Related U.S. Application Data

(60) Provisional application No. 62/518,304, filed on Jun. 12, 2017.

(51) Int. Cl.
| | |
|---|---|
| *H04B 10/07* | (2013.01) |
| *H04L 29/06* | (2006.01) |
| *H04B 10/85* | (2013.01) |
| *H04B 10/079* | (2013.01) |
| *G01M 11/00* | (2006.01) |

(52) U.S. Cl.
CPC ......... *H04B 10/0705* (2013.01); *G01M 11/33* (2013.01); *H04B 10/07955* (2013.01); *H04B 10/85* (2013.01); *H04L 63/1416* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,848,204 | A  * | 12/1998 | Wanser | G01L 1/246 385/12 |
| 7,120,324 | B2 * | 10/2006 | Murphy | G02B 6/262 385/12 |
| 7,142,737 | B1 * | 11/2006 | Murphy | G01M 11/3181 385/13 |
| 7,333,681 | B2 * | 2/2008 | Murphy | G02B 6/421 385/12 |
| 7,514,670 | B2 * | 4/2009 | Anderson | G08B 13/186 250/227.14 |

(Continued)

*Primary Examiner* — Andrew Jordan
(74) *Attorney, Agent, or Firm* — Adrian D. Battison; Ade & Company Inc.; Ryan W. Dupuis

(57) ABSTRACT

An optical fiber is monitored for changes in a monitor signal caused when the fiber is subjected to vibration, motion, or handling typical of an intrusion attempt and for triggering an alarm condition in response by one or more sensors. The sensor emits data on each disturbance event including the existence of the disturbance event and a value associated with the disturbance event dependent on an intensity of the disturbance. The arrangement herein provides an algorithm to analyze the disturbance events which calculates for each event a score dependent on the presence of the event and the value associated with the event, generates a summation of the scores in a FIFO and when the summation of the scores exceeds a predetermined threshold within a predetermined time period, the processor emits a signal triggering the alarm condition.

16 Claims, 2 Drawing Sheets

(56) References Cited

U.S. PATENT DOCUMENTS

| | | | | |
|---|---|---|---|---|
| 7,532,781 | B2* | 5/2009 | Thompson | A61B 5/1126 385/12 |
| 7,668,411 | B2* | 2/2010 | Davies | G01H 9/004 385/12 |
| 8,077,314 | B2* | 12/2011 | Davies | G01K 11/32 356/344 |
| 8,233,755 | B2* | 7/2012 | Murphy | H04B 10/071 356/364 |
| 8,462,324 | B2* | 6/2013 | Logan | G01D 5/35345 356/73.1 |
| 9,046,669 | B2* | 6/2015 | Murphy | G02B 6/44 |
| 9,490,929 | B2* | 11/2016 | Badinelli | G02B 6/4446 |
| 9,677,956 | B2* | 6/2017 | Hill | G01D 5/3538 |
| 9,954,609 | B2* | 4/2018 | Murphy | H04B 10/0795 |
| 2004/0234187 | A1* | 11/2004 | Wong | A61B 5/1101 385/13 |
| 2006/0002649 | A1* | 1/2006 | Murphy | G02B 6/262 385/12 |
| 2007/0133922 | A1* | 6/2007 | Murphy | G02B 6/421 385/12 |

* cited by examiner

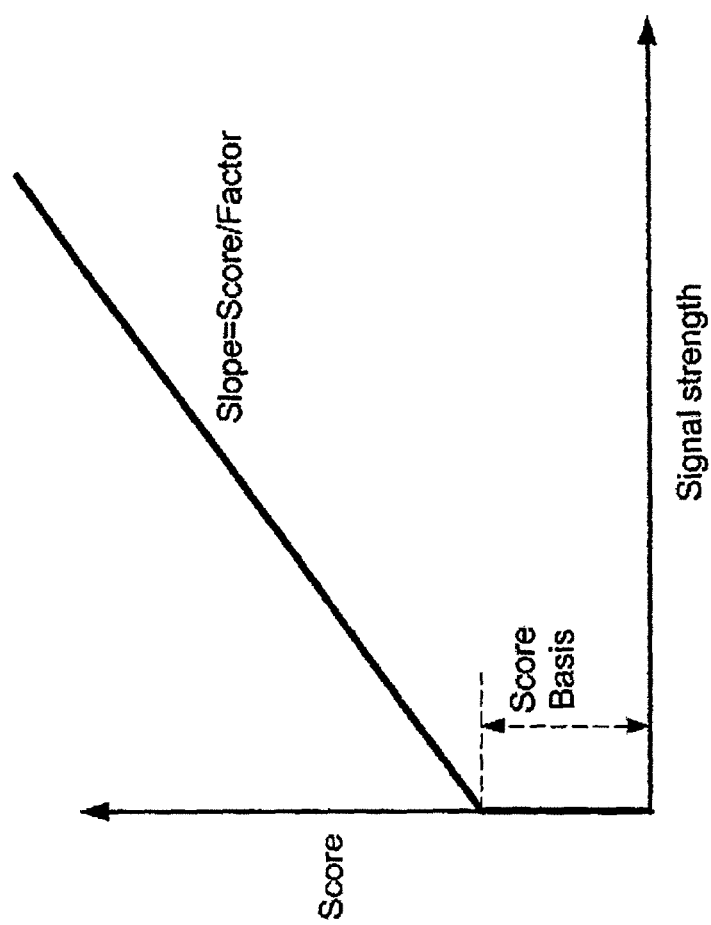

MONITORING A FIBER OPTIC CABLE FOR INTRUSION USING A WEIGHTED ALGORITHM

This application claims the benefit under 35 USC 119 ( ) of Provisional Application 62/518,304 filed Jun. 12, 2017, the disclosure of which is incorporated herein by reference.

This invention relates to a method of monitoring alarm events on a fiber optic cable system using a weighted signal discrimination and detection algorithm for analyzing the disturbance events indicative of intrusion attempts.

The arrangement herein can be used for monitoring optical fibers which can be used in many different situations such as communication fibers or perimeter monitoring fibers.

BACKGROUND OF THE INVENTION

This application relates to an alarm system such as that manufactured by the present assignees under the trademarks Interceptor and Vanguard, details of which are available from a number of prior issued patents by the Assignees including U.S. Pat. No. 7,333,681 (Murphy) issued Feb. 19, 2008 which describes a system for securing multimode fibers, U.S. Pat. No. 7,142,737 (Murphy) issued Nov. 28, 2006 which describes a system for securing single mode fibers, and U.S. Pat. No. 8,233,755 (Murphy) issued Jul. 31, 2012 which describes a method for securing an optical communications network path by learning and suppressing ambient disturbances. The disclosures of each of the above patents are incorporated herein by reference.

In each of these systems, an optical signal is transmitted along a fiber and the signal received at a receiver which extracts a received signal which can have different characteristics relative to the transmitted signal due to movement of the fiber. The received signal is thus analyzed in a light signal analysis system to extract a signal indicative of any changes in characteristics of the light signal. This signal is then itself analyzed to determine whether the characteristics have changed sufficiently to indicate that a movement of the fiber indicative of an attempt to intrude into the fiber has occurred. The system further includes a control and alarm system which controls the system and an alarm in the event that an intrusion has been found.

The arrangement and location of the components can vary widely with the receiver located at the same end as the transmitter or at an opposed end. The alarm and control system can also be located at different positions in the system. Communication of data between the components can be carried out in different ways.

Many different constructions and techniques for signal analysis for this system are well known to persons skilled in the art and can be determined from one or more of the patents of the Assignees.

According to US Government regulations, a network carrying unencrypted classified data must be protected by a Protected Distribution System (PDS), One form of PDS is the Alarmed Carrier, which is a system by which a conveyance or carrier is alarmed by a device for detecting intrusions and attempted intrusions.

An example of an arrangement of this type is shown in U.S. Pat. No. 7,706,641 issued Apr. 27, 2010 by the present Applicants which describes in detail the monitoring system used in the present application, the disclosure of which is incorporated herein by reference. This patent describes that some or all of the optical fibers of a single-mode or multi-mode cable are monitored for intrusion by transmitting through the fibers a signal which can be analyzed for changes in its characteristics which are indicative of movement as a prelude to an intrusion event.

Data can be stolen from an optical fiber by removing the jacket and installing a tap device on the fiber or by other methods. Optical fiber intrusion detection systems of the type described above detect when a fiber cable is being subjected to vibration, motion, or handling that would be typical of an intrusion attempt. The system reports the intrusion attempt to the cable owner so that the cable can be inspected and the threat removed.

The fiber intrusion detection system works by transmitting a monitoring signal through a fiber as a single fiber or as a loop. Disturbances on the fiber cause the monitoring signal to be modulated. The modulated signal is received, digitized and processed, and alarms are raised when an intrusion is detected.

In the arena of sensor and transducer monitoring, a filtering mechanism may be needed to minimize false positive alarms that may be caused by spurious disturbances. It is important to recognize the occasional alarm and record it for later evaluation as needed without raising a full security alarm condition.

One example of a system of this type is disclosed in U.S. Pat. No. 9,455,999 issued Sep. 27, 2016 by Sohn et al, the disclosure of which is incorporated herein by reference. In this arrangement, there is provided a method in which events that do not themselves exceed a threshold are counted within a time limited buffer. That is the system only counts events that do not individually meet a first amplitude threshold indicative of a fiber break or disconnect so that the system requires a two stage test for the events. First, does the event itself meet a first amplitude threshold indicative of a fiber break or disconnect and, only if it does not meet that threshold, the system acts to count the number of such events and to trigger an alarm if the number of events counted within a predetermined time period exceeds a second threshold.

SUMMARY OF THE INVENTION

According to the invention there is provided a method for monitoring an optical fiber for changes in a monitor signal transmitted along the fiber caused when the fiber is subjected to vibration, motion, or handling that would be typical of an intrusion attempt and for triggering an alarm condition in response thereto comprising:

transmitting the monitoring signal along the fiber;

using one or more sensors to detect disturbance events of changes in the monitor signal transmitted along the fiber caused when the fiber is subjected to vibration, motion, or handling that would be typical of an intrusion attempt;

wherein the sensor emits data on each disturbance event including the existence of the disturbance event and a value associated with the disturbance event dependent on an intensity of the disturbance;

and using an algorithm in a processor to analyze the disturbance events to determine when the alarm signal should be triggered;

wherein the algorithm:

calculates for each event a score dependent on the presence of the event and the value associated with the event;

generates a summation of the scores;

and when the summation of the scores exceeds a predetermined threshold within a predetermined time period, the processor emits a signal triggering the alarm condition.

The method can be used where the fiber comprises a single mode fiber and wherein the sensor is responsive to changes in polarization of the monitor signal. In this case the transmitted optical signals can be provided from a polarized light source.

The method can be used where the fiber comprises a multi-mode fiber and the sensor is responsive to changes in modal power distribution in the fiber which changes are indicative of manipulation of the fiber.

The method can be used where the received signals are at an end remote from a transmitted end or at the transmit end.

Preferably the score attributed to each event is dependent on the intensity value. This can be a direct proportionality or in some cases the score attributed to each event depends on both the intensity value of the event and scoring factors associated with that event type so that there is no direct proportionality.

Preferably the event is scored through a basis/factor method so that when an event occurs it can produce an event score which indicates the severity of the event.

Preferably the equation for converting this into a score is:

$$\text{event score} = \text{event basis} + (\text{event intensity} \times \text{event factor})$$

The method can allow the parameters of the score to be adjusted to achieve different alarming characteristics.

In some cases, the events produce a vector of values where the event is scored through a vector basis/factor method, where a different basis/factor parameter is applied to each value of the vector, and the results summed to form a final score Typically the events and the scores associated therewith are stored and summed in a FIFO where preferably the predetermined time period is defined by a time period of the FIFO which is a sliding time window in which alarm events are included in summation.

This method can be used where there is provide a time schedule arrangement of the FIFO in which the threshold and/or scoring factors are changed based on time to change detection goals.

In some cases there can be provided a multiple FIFO arrangement for storing different ones of the events and the scores associated therewith. In this case each FIFO can be scheduled independently.

Thus the common short coming of the above prior art systems is that the magnitude or score of the disturbance is not considered in the handling algorithms. The presence of a disturbance is treated as a binary event, and causes a counter to increment.

When a single event is occurs, it might be displayed with a caution color on a display or light, recorded in a log, or sent out over an electronic reporting mechanism such as SNMP traps, relay contacts, email, etc. When a case is escalated to alarm status, it might be displayed with an alarm color on a display or light, recorded in a log, or sent out over an electronic reporting mechanism such as SNMP traps, relay contacts, email, etc; perhaps sounding a visual or audible alarm.

The object of this invention includes the ability to react to exceptional events, recognize and alarm at events that are much higher than the ambient, and a clear indication of a potentially nefarious event such as a fence, perimeter, conduit, or cable breach.

In this invention, a weighting system is used to assign a magnitude or score to the disturbance, thereby more quickly filling the "bucket" required to sound an alarm if the events are themselves large.

According to the invention there is provided in a method of the type herein, a system for assigning value to a monitoring system where the magnitude or score of the event adds weight to the import of the event.

Preferably the events are accumulated in a first in first out (FIFO) register that is governed by an expiration clock.

Preferably the event weights are accumulated during the FIFO time window, causing an escalation of alarm status based upon magnitude or score of events.

Preferably an exceptionally large event causes an immediate escalation of alarm reporting or response.

BRIEF DESCRIPTION OF THE DRAWINGS

FIG. 2 illustrates the equation where score=basis+(strength*factor)

DETAILED DESCRIPTION

Figure 1:
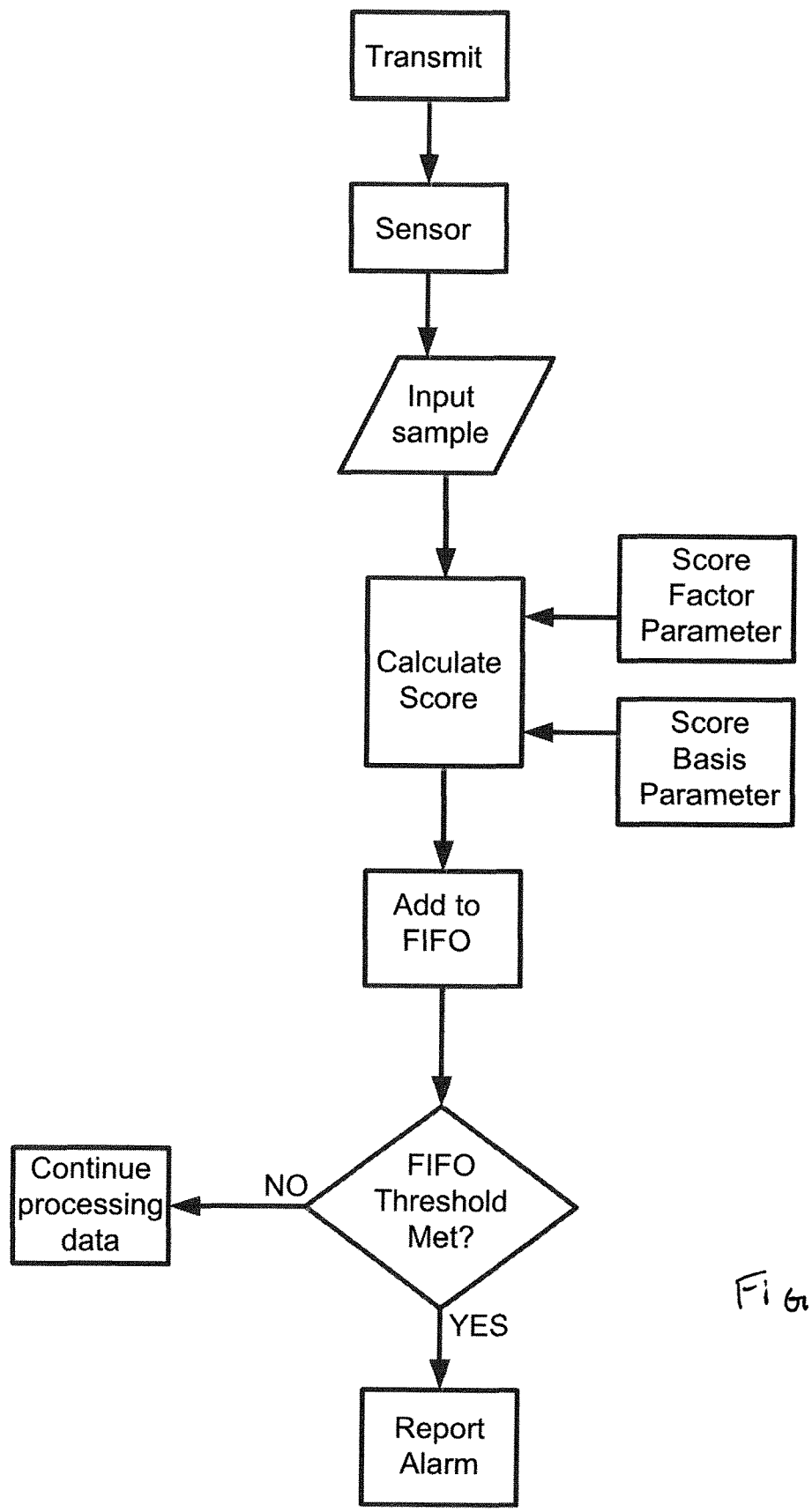
FIG. 1 is a flow chart showing the steps of the method according to the present invention.

In U.S. Pat. No. 7,333,681 (Murphy) issued Feb. 19, 2008 which describes a system for securing multimode fibers, U.S. Pat. No. 7,142,737 (Murphy) issued Nov. 28, 2006 which describes a system for securing single mode fibers, there are shown methods for monitoring fibers by transmitting a monitor signal along the fiber and detecting changes in the monitor signals. The analysis is arranged to detect changes in the signals when the fibers fiber are subjected to vibration, motion, or handling that would be typical of an intrusion attempt. In response to the changes an alarm signal is generated.

The techniques described in these patents are examples of many different monitoring systems where events are detected by monitoring changes in a signal passing along a fiber to be monitored. That is the sensor concerned may monitor other characteristics of the signals indicative of the intrusion event in a manner known to persons skilled in the art. The system may use more than one sensor each for monitoring a different characteristic of the signal.

The signal is of course subject to many changes generating a series of events which must be continually monitored to determine when the series of events is indicative of an intrusion which requires the alarm to be generated and to distinguish from events that are false or insufficient to be indicative of intrusion.

In practice the amplitude of the signal is related to the amount of fiber perturbation such as motion, vibration, strain, temperature and is obtained by monitoring systems such as those referenced in the patents listed.

The system described herein is different from the above previous system because it includes a variable scoring mechanism. In this, the score attributed to each event depends on the characteristics of the event, and the scoring parameters associated with that event type. Some possible metrics which might be scored include amplitude, phase shift, rotation of state of polarization measured in degrees or change/distribution of Stokes Parameters, fiber displacement, fiber resonant frequency, temperature shift, acoustic amplitude, fiber strain, wavelength shift, Rayleigh phase shift.

One way of scoring an event is through the basis/factor method. When an event occurs it can produce an event intensity value ranging from 0 to infinity, which indicates the severity of the event. The equation for converting this into a score is:

event score=event basis+(event intensity×event factor)

The scoring parameters (basis and factor in this case), can be adjusted to achieve different alarming characteristics.

Not all events reduce to a simple event intensity scalar. Some events produce a vector of values. The basis/factor method can be extended into vector basis/factor method, where a different basis and/or scoring factor is applied to each element of the vector, and the results summed to form a final score.

That is the events and the data associated therewith can be divided into different classes for example "low band, mid band, high band", and a different factor can be used for each to calculate the score. Or each coefficient of an alarm envelope could be a member of the vector. The term "vector" thus is directed generically to just mean more than just a single intensity scalar. An example the present algorithm can be used to break the frequency plot into low, medium, and high bands. Each of these bands can be treated differently, for example low frequency might be for road noise and rumble, in which case the system can be used to make it more or less sensitive by using different calculation or scoring factors in the calculation of the score for the event concerned.

These are not the only scoring mechanisms. Other event types may produce different outputs and have different scoring methods with different scoring parameters.

In a system of the type described above, the FIFO acts as a quarantine FIFO arrangement. In this arrangement, the FIFO acts to hold back alarm events until a minimum, time localized alarm intensity is achieved. The FIFO period is the so sliding time window in which alarm events are considered. New alarm events are added to the FIFO, and then removed once they have become older than the FIFO period. Each event has an event score. If the sum of all event scores in the FIFO exceed the FIFO threshold, then all events in the FIFO are used in the summation. Thus the FIFO acts as a holding area where the event scores are placed. It is not a predetermined depth FIFO, rather depth is dictated by the sliding time window. When held in the quarantine, event scores are added as a way to determine the alarm status. As the time window for events expires, they are dropped off and their score is no longer considered. There is an ongoing running total for the scores within the quarantine FIFO, and as the events fall out the back, their value is no longer of consequence.

It is also possible in this system, that one single event in the FIFO that exceeds the FIFO threshold, in which case the summation occurs based on that single event and exceeds the threshold for the summation thus triggering the alarm condition.

In a system of the type described above, another improvement relates to the use of a plurality of FIFO arrangements. In this, the system can employ multiple FIFOs simultaneously to achieve different alarm detection goals. Each FIFO will have its own FIFO threshold. Each FIFO can accept different combinations of event types. For example, there may be an individual FIFO for each event type, a FIFO for all events, plus additional FIFO with different event type combinations for special detection goals. The scoring parameters for each event type in each FIFO can be different.

Examples of different events as detected by different sensors and applied to different FIFOs include lift fiber, vibration of fiber, bend fiber, damage fiber, compression of fiber, longitudinal compression, temperature variation.

In a system of the type described above, one improvement relates to a FIFO schedule arrangement. In this, the FIFO threshold and scoring parameters can change to change detection goals. Thus scoring parameters can be changed to change sensitivity by using different factors for the calculation of score depending on the changes to the parameters. Many different parameters can be used to change the calculation factors used, for example, according to time of day such as day to night. Each FIFO can be scheduled independently.

Each alarm in the FIFO thus provides a "score", which is dependent on a measure of the intensity of the event, that is typically the amplitude of the signal received. If the sum of all scores in the FIFO exceed a predefined threshold, then all events currently in the FIFO are included in the summation.

Once the time period set in the FIFO for any event expires, that event is removed from the FIFO and can no longer contribute to the summation, regardless of its score.

An event is scored from the sum of two values, a basis and a factor where "basis" is a constant value automatically given to the event and "Factor" is multiplied with an event intensity to provide a variable value or score.

Different event types have different basis and factors.

As shown the flow chart in FIG. 1, the system provides the following event lifetime flowchart:

The signal processing system detects a monitoring event.
The intensity of the event is measured.
The event is scored, basis+(intensity×factor)
The event is timestamped with the current time.
The event, score, and timestamp are inserted into the FIFO.
The FIFO is examined. Any events that are expired (current time>(timestamp+FIFO period) are removed from the FIFO.
The scores of all remaining events (including the one just added) are summed. If the sum exceeds the predefined threshold, then the alarm is triggered.
If the sum of the scores does not exceed the threshold then the FIFO is preserved as is.

In the following example are shown charts which represent the effect of the magnitude or score on the alarm parsing algorithms. For the first example, events of various magnitudes between 1 and 5 units are present. The threshold defining escalation of the alarm is set to 15 units. As shown, with the previous arrangement of Sohn, fifteen actual disturbances are required to escalate the case to an alarm condition as the value of each event is a count of 1. However with the present invention, the system register the score related to the intensity of some of the events and the alarm will sound after only seven events as shown.

| | | Total | |
|---|---|---|---|
| Event number | Signal Strength | 15 Detection using current art | 17 Detection using this invention |
| 1 | 1 | 1 | 1 |
| 2 | 3 | 1 | 3 |
| 3 | 5 | 1 | 5 |
| 4 | 2 | 1 | 2 |
| 5 | 1 | 1 | 1 |
| 6 | 1 | 1 | 1 |
| 7 | 4 | 1 | 4 |
| 8 | 1 | 1 | |
| 9 | 3 | 1 | |

|  | | Total | |
|---|---|---|---|
| Event number | Signal Strength | 15 Detection using current art | 17 Detection using this invention |
| 10 | 2 | 1 | |
| 11 | 2 | 1 | |
| 12 | 1 | 1 | |
| 13 | 5 | 1 | |
| 14 | 1 | 1 | |
| 15 | 4 | 1 | |

The following chart represents the effect of magnitude on the alarm parsing algorithms. For this example, events of various magnitudes between 1 and 5 units are present, with one being much greater than the rest of the events. The threshold defining escalation of the alarm is set to fifteen units. As shown, with the current art, fifteen actual disturbances would be required to escalate the case to an alarm condition as the value of each event is a count of 1. However with this invention, the system acts to register the intensity of some of the events and the alarm is triggered after only four events:

|  | | Total | |
|---|---|---|---|
| Event number | Signal Strength | 15 Detection using current art | 16 Detection using this invention |
| 1 | 1 | 1 | 1 |
| 2 | 1 | 1 | 1 |
| 3 | 1 | 1 | 1 |
| 4 | 13 | 1 | 13 |
| 5 | 1 | 1 | |
| 6 | 1 | 1 | |
| 7 | 1 | 1 | |
| 8 | 1 | 1 | |
| 9 | 1 | 1 | |
| 10 | 1 | 1 | |
| 11 | 1 | 1 | |
| 12 | 1 | 1 | |
| 13 | 1 | 1 | |
| 14 | 1 | 1 | |
| 15 | 1 | 1 | |

The invention claimed is:

1. A method for monitoring an optical fiber for changes in a monitor signal transmitted along the fiber caused when the fiber is subjected to vibration, motion, or handling that would be typical of an intrusion attempt and for triggering an alarm condition in response thereto comprising:
   transmitting the monitoring signal along the fiber;
   using one or more sensors to detect disturbance events of changes in the monitor signal transmitted along the fiber caused when the fiber is subjected to vibration, motion, or handling that would be typical of an intrusion attempt;
   wherein the sensor emits data on each disturbance event including the existence of the disturbance event and a value associated with the disturbance event dependent on an intensity of the disturbance;
   and using an algorithm in a processor to analyze the disturbance events to determine when the alarm signal should be triggered;
   wherein the algorithm:
      calculates for each event a score dependent on the presence of the event and the value associated with the event;
      generates a summation of the scores;
      and when the summation of the scores exceeds a predetermined threshold within a predetermined time period, the processor emits a signal triggering the alarm condition.

2. The method according to claim 1 wherein the fiber comprises a single mode fiber and wherein the sensor is responsive to changes in polarization of the monitor signal.

3. The method according to claim 1 wherein the fiber comprises a multi-mode fiber and the sensor is responsive to changes in modal power distribution in the fiber which changes are indicative of manipulation of the fiber.

4. The method according to claim 1 wherein the received signals are at an end remote from a transmitted end.

5. The method according to claim 1 wherein the transmitted optical signals are provided from a polarized light source.

6. The method according to claim 1 wherein the score attributed to each event is dependent on the intensity value.

7. The method according to claim 1 wherein the score attributed to each event depends on the intensity value of the event and scoring factors associated with that event type.

8. The method according to claim 1 wherein the event is scored through a basis/factor method so that when an event occurs it can produce an event score which indicates the severity of the event.

9. The method according to claim 1 wherein parameters of the score are adjusted to achieve different alarming characteristics.

10. The method according to claim 9 wherein the equation for converting this into a score is:

event score=event basis+(event intensity×event factor).

11. The method according to claim 1 wherein some events produce a vector of values where the event is scored through a vector basis/factor method, where a different basis/factor parameter is applied to each value of the vector, and the results summed to form a final score.

12. The method according to claim 1 wherein the events and the scores associated therewith are stored and summed in a FIFO.

13. The method according to claim 12 wherein the predetermined time period is defined by a time period of the FIFO which is a sliding time window in which alarm events are included in summation.

14. The method according to claim 13 wherein there is provide a time schedule arrangement of the FIFO in which the threshold and/or scoring factors are changed based on time to change detection goals.

15. The method according to claim 14 wherein there is provided a multiple FIFO arrangement for storing different ones of the events and the scores associated therewith.

16. The method according to claim 15 wherein each FIFO is scheduled independently.

* * * * *